W. A. KÖNEMAN.
TIRE.
APPLICATION FILED FEB. 28, 1910.
988,475.
Patented Apr. 4, 1911.
2 SHEETS—SHEET 1.
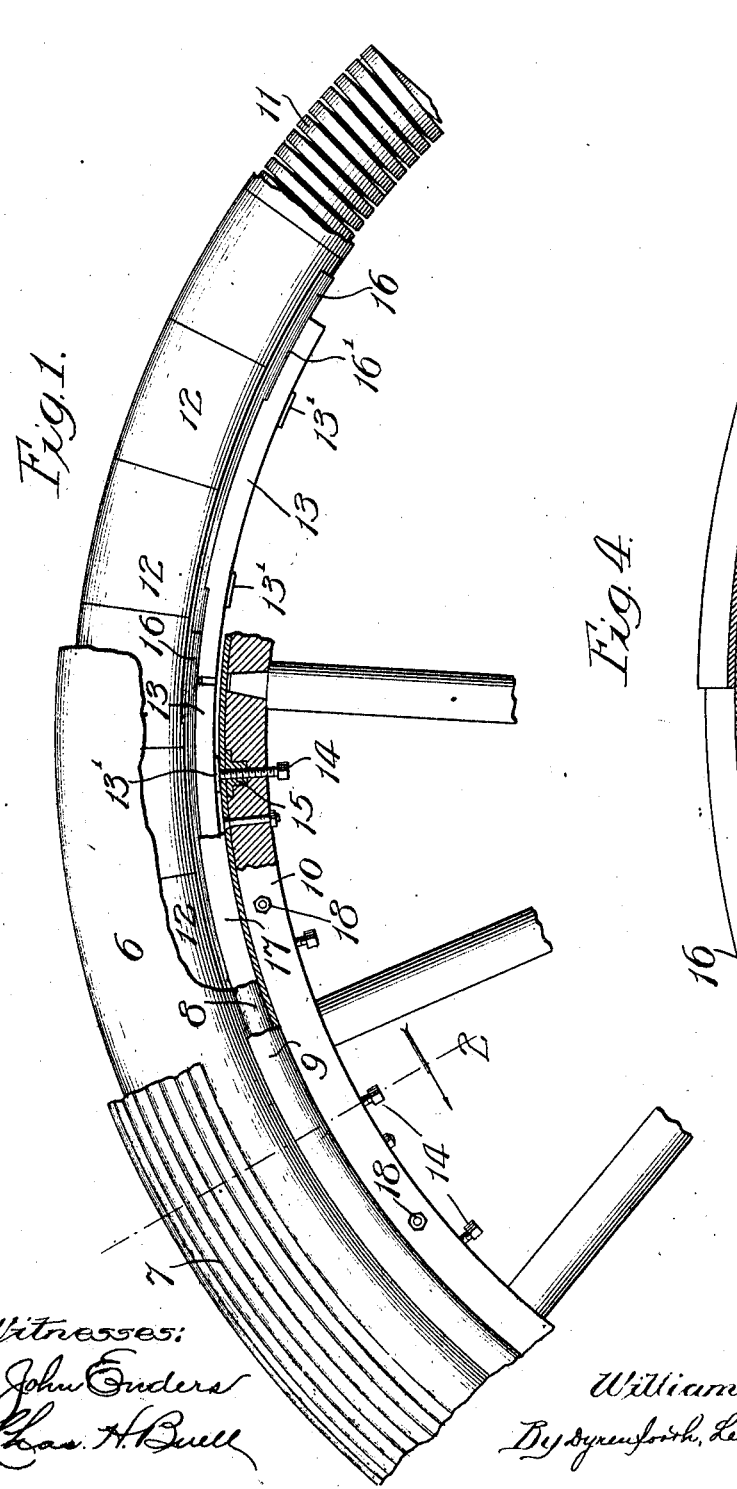
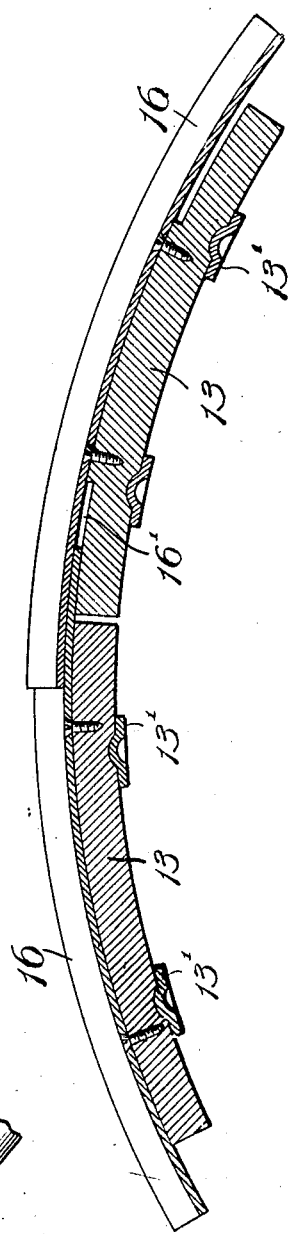
Witnesses:
John Enders
Chas. H. Buell
Inventor:
William A. Köneman.
By Dyrenforth, Lee, Chritton & Wiles,
Attys.

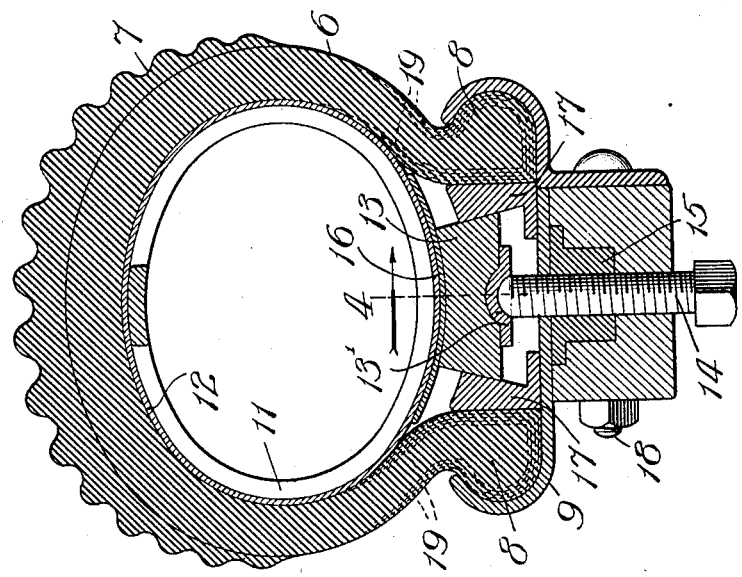
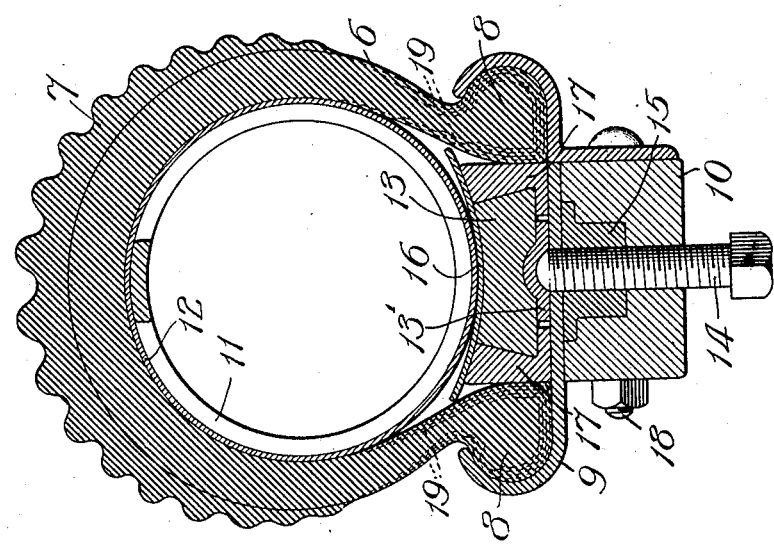

UNITED STATES PATENT OFFICE.

WILLIAM A. KÖNEMAN, OF CHICAGO, ILLINOIS.

TIRE.

988,475.   Specification of Letters Patent.   Patented Apr. 4, 1911

Application filed February 28, 1910. Serial No. 546,266.

*To all whom it may concern:*

Be it known that I, WILLIAM A. KÖNEMAN, a citizen of the United States, residing at 177 Eugenie street, Chicago, in the county of Cook and State of Illinois, have invented a new and useful Improvement in Tires, of which the following is a specification.

My invention relates to an improvement in the class of tires used on automobiles and the like.

The primary object of my invention is to provide a construction of tire, which shall be neither pneumatic nor solid, but which shall avoid the objections to the solid tire and approximate, in use, the desirable properties in pneumatic tires without being susceptible, like the latter, to injury from puncture and blow-outs.

My improvement consists, essentially, of a sheath or jacket of rubber, or like material, adapted to be secured on the rim of a wheel to form the tread therefor, with a spring core in the sheath, and means for adjusting the core to cause it to take up and compensate for stretching of the material of the sheath.

Referring to the accompanying drawings: Figure 1 is a broken view in side elevation showing my improved tire on a wheel-rim; Fig. 2 is an enlarged section on line 2, Fig. 1, showing the spring core in its normal condition. Fig. 3 is a view like that presented in Fig. 2, but showing the spring core in its compressed condition of taking up the stretch of the sheath to maintain the latter under proper tension, and Fig. 4 is a section on line 4, Fig. 3.

The sheath 6 may be the ordinary rubber tire-cover commonly used for automobiles to confine the inner inflatable air-tube, which is dispensed with by my improvement; the latter, moreover, permitting the cover or sheath to be made very much cheaper than that used for confining the inflatable tube since it requires to be built less strongly, employing fewer layers of fabric, and the rubber used may be of comparatively low-grade quality, and nevertheless produce, at low cost, a tire more durable and approximately as desirable in every way as the ordinary pneumatic tire. The sheath 6, with a corrugated tread-portion 7 cemented in place, is shown to be provided with the usual beaded edges 8, 8, at which to confine it in the undercut or grooved sides of the rim 9, which should, by preference, be sectional, as indicated, to render its outer annular section, shown bolted to the felly 10, removable to facilitate placing the tire on and taking it off the rim.

In the sheath is a spring core 11, the preferred form of which is that of a closely wound coil of spring-steel of rectangular or flat cross-section, the ends of the coil, to render it annular, being joined, as by brazing. The core should be wrapped with fabric 12, in longitudinal sections, each formed of layers which may be rubber-frictioned or otherwise united, to prevent abrading or cutting the sheath 6 by the movement of the spring against it when a wheel equipped with my improvement is running. About the rim are seated, in endless series, similar successively contacting blocks 13, which may best be formed, whether of wood or metal, out of a circular ring of the proper cross-section by cutting it into sections each, preferably, about four inches long. These blocks, which have inwardly tapering sides to render them wedge-shaped, and have concave or depressed outer faces, are provided in their inner faces with central depressions to receive, when the blocks are wooden, correspondingly-shaped metal cups $13^1$ for protecting the wood against wear from set screws 14 which work against them through the felly in internally-threaded metal bearings 15 let into the outer surface thereof at suitable intervals. The blocks bear against the under surface of the core through the medium of concavo-convex plates 16, fastened to the blocks and wider than the latter to increase the area of bearing surface against the spring; and the plates should be longer than the blocks to cause each alternate plate to overlap the adjacent ends of those between which it extends and thereby cause the spaces produced between the blocks, by spreading them to press the spring-core as and for the purpose hereinafter explained, to be bridged. The ends of the plates thus overlapped are shown in Fig. 4 to enter offsets $16^1$ formed in the blocks to admit them.

The circumferential series of blocks is confined between similar continuous seating-rings 17, 17, on the rim, of approximate L-shape in cross-section with their opposing faces 18 correspondingly inclining inwardly toward each other to conform to the sides of the blocks, these rings being interposed between blocks and the cover-beads 8 to the straight inner sides of which the opposing sides of the rings conform. The cover 7 may be composed of solid rubber of moderate density, and it is preferably lined along the inner surfaces of its sides with several layers 19 of fabric (as cotton duck), omitting, however, any lining of the crown or tread-portion to enable the rubber to stretch under the spring-pressure of the core when expanded in the manner hereinafter described.

When, with time and service, the rubber of the cover takes on what is known in the art as "permanent stretch," to compensate therefor and maintain the proper tension of the tire, the core is pressed to expand it laterally by adjusting the screws 14 to force the blocks against it, thereby unseating them into the position represented of the block shown in Fig. 3 with the incidental result, owing to the wedging effect of the blocks against the rings, of crowding the latter against the beads 8 and tightening them in the rim to resist the tendency of the spring, under the pressure referred to, to dislodge the cover. This pressure strains the core into the elliptical shape represented in Fig. 3, causing it to exert laterally in both directions a moderate tensile strain against the lined sides of the cover from about the center of the spring to the beads 8. Thus the stretch in the rubber and any sagging of the spring-core may be taken up by the blocks from time to time with the effect of maintaining the tire in perfect tension for its proper working condition and assuring its economic wear. It should be explained that the "permanent stretch" referred to is a condition to which the rubber in all rubber tires is subject by their use, and the softer the quality of the rubber, the greater its tendency to work, stretch and creep under the load it carries. To reduce this tendency in rubber carriage-tires it is the practice to manufacture them of a rubber compound possessing a degree of hardness and of density which will adapt them to carry a load without compressing unduly, and in truck-tires these qualities are materially increased in the rubber. It is because of the tendency to permanent stretch of the rubber in tires that solid automobile tires made of soft and highly resilient rubber are undesirable, and that indifferent results are attained from those made up of rubber and fabric and those of the hollow variety. As to the great difference in wearing quality between a pneumatic and a solid tire, such difference may properly be stated, as the ascertained fact, to be attributable to the stretch of both the fabric and the rubber, in the pneumatic variety, being constantly compensated for and its injurious tendency counteracted by the air-pressure within the tire. A pneumatic tire, therefore, in an insufficiently inflated condition, is soon ruined. On the other hand, with a solid rubber tire that is unduly soft or yielding, the exterior rubber on the tread soon stretches to an extent which causes it to separate and tear away from the interior; or the tire tends to buckle. Moreover, in a pneumatic tire dependence must be had for the requisite tensile strength to adapt it to withstand the internal air-pressure, on numerous plies of fabric (cotton cloth) extending throughout the tire, since the pressure is uniform upon each square inch of the surface; and for cementing the layers of fabric the purest and finest grade of rubber is required for allowing the requisite pliability and strength in the structure, rendering the cost of manufacture very great.

By my improvement herein described a tire is provided which not only enables the permanent stretch of the rubber to be taken up but causes the pressure-stretch to be exerted only on the wearing tread, the base of the cover being only or mainly subjected to a pulling stretch, and to very little, if any appreciable transverse pressure. Thus my improvement enables the multi-ply cover to be dispensed with and supplanted by mere reinforcing strips of fabric on the pulling-portions of the rubber, or, at most, by comparatively few layers of fabric on the inner surface of the tire-jacket or cover, thereby enabling a relatively inferior quality of rubber compound to be used for the cover similar to that ordinarily used for carriage-tires, and reducing, accordingly, the cost of manufacture.

What I claim as new and desire to secure by Letters Patent is:

1. In combination, a wheel-rim, a rubber tire-cover secured to the rim, a spring-core within the cover, L-shaped tire-clamping rings on the rim, adjustable members seated on and between said rings, and means for adjusting said members to cause the same to exert pressure against the core and the rings to expand the same laterally, for the purpose set forth.

2. In combination, a wheel-rim, a rubber tire-cover secured to the rim, a spring-core within the cover, L-shaped tire-clamping rings on the rim having inclined inner faces, blocks seated on and between the rings, and means for forcing said blocks upwardly against the core and laterally against the rings to cause lateral expansion of the said parts, for the purpose set forth.

3. In combination, a wheel-rim, a rubber tire-cover secured on the rim, L-shaped tire-clamping rings on the rim, wedge-shaped blocks adjustably seating in series about the rim on and between said rings, a spring-core within the cover about the blocks, and set-screws engaging the blocks, for the purpose set forth.

4. In combination, a wheel-rim on a felly, a rubber tire-cover secured on the rim, L-shaped tire-clamping rings on the rim, wedge-shaped blocks adjustably seated in series about the rim and between said rings, and provided on their under surfaces with wear plates adapted in the retracted position of said blocks to fill the space between the lower edges of said rings, a spring-core within the cover about the blocks, threaded screw-bearings at intervals in the felly, and set-screws working in said bearings against the blocks, for the purpose set forth.

5. In combination, a wheel-rim on a felly, a rubber tire-cover secured on the rim, tire-clamping rings on the rim, wedge-shaped blocks adjustably seated in series about the rim and between said rings and having concave outer faces, concavo-convex plates secured to the outer faces of said blocks and extending beyond the sides thereof, and set-screws working in the felly against said blocks, for the purpose set forth.

6. In combination, a wheel-felly, a rim thereon, a rubber tire-cover having beaded edges at which it is engaged by the rim, L-shaped rings surrounding the rim and having straight outer faces bearing against said edges and inclined inner faces, wedge-shaped blocks adjustably seating in series about the rim between said rings, a spring core within the cover about the blocks, and means for forcing said blocks upwardly against the core and laterally against the rings to cause lateral expansion of the said parts, for the purpose set forth.

7. In combination, a wheel-rim on a felly, a rubber tire-cover secured on the rim, blocks adjustably seating in series about the rim, and provided with plates on their outer faces, said plates being wider and longer than the faces of the blocks and overlapping each other endwise, a spring core within the cover about the blocks and seating on said plates, and set-screws working in the felly against said blocks, for the purpose set forth.

WILLIAM A. KÖNEMAN.

In presence of—
A. U. THORIEN,
R. A. SCHAEFER.

Copies of this patent may be obtained for five cents each, by addressing the "Commissioner of Patents, Washington, D. C."